United States Patent
Franke et al.

(10) Patent No.: US 9,734,596 B2
(45) Date of Patent: Aug. 15, 2017

(54) METHOD FOR GENERATING EXECUTABLE APPLICATIONS WITH DYNAMIC SCALABLE VECTOR GRAPHICS AND COMPILER FOR CARRYING OUT THE METHOD

(71) Applicant: HEIDELBERGER DRUCKMASCHINEN AG, Heidelberg (DE)

(72) Inventors: Volkhard Franke, Schriesheim (DE); Edelbert Koenig, Kronau (DE); Markus Sailer, Angelbachtal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/966,036

(22) Filed: Dec. 11, 2015

(65) Prior Publication Data

US 2016/0171719 A1 Jun. 16, 2016

(30) Foreign Application Priority Data

Dec. 11, 2014 (DE) .................. 10 2014 225 557

(51) Int. Cl.
| | |
|---|---|
| *G06F 9/45* | (2006.01) |
| *G06T 9/00* | (2006.01) |
| *G06F 9/44* | (2006.01) |
| *G06F 17/22* | (2006.01) |
| *G06T 1/20* | (2006.01) |

(Continued)

(52) U.S. Cl.
CPC .................. *G06T 9/00* (2013.01); *G06F 8/30* (2013.01); *G06F 8/427* (2013.01); *G06F 17/2247* (2013.01); *G06T 1/20* (2013.01); *G06T 3/40* (2013.01); *G06T 13/00* (2013.01); *G06F 8/51* (2013.01); *G06T 2200/24* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 2003/0132938 A1* | 7/2003 | Shibao | G06T 13/00 345/473 |
| 2003/0149934 A1* | 8/2003 | Worden | G06F 17/3056 715/239 |

(Continued)

OTHER PUBLICATIONS

Jolif, C., "Bringing SVG Power to Java Applications", Jan. 2003, URL: http://www.oracle.com/technetwork/articles/java/svg-141884.html.

(Continued)

*Primary Examiner* — Chameli Das
(74) *Attorney, Agent, or Firm* — Laurence A. Greenberg; Werner H. Stemer; Ralph E. Locher

(57) ABSTRACT

A method for generating executable applications with dynamic, scalable vector graphics by using a compiler operated by a computer includes marking the dynamic elements of the scalable vector graphics by an attribute. During the compilation process, on the basis of the attribute, the compiler translates the dynamic elements of the scalable vector graphics into program code that is part of the program code of the executable applications. A compiler is also provided for carrying out the method.

4 Claims, 4 Drawing Sheets

(51) Int. Cl.
*G06T 3/40* (2006.01)
*G06T 13/00* (2011.01)

(56) References Cited

U.S. PATENT DOCUMENTS

| | | | | |
|---|---|---|---|---|
| 2004/0113937 | A1* | 6/2004 | Sawdey | G06F 9/4443 |
| | | | | 715/738 |
| 2004/0163046 | A1* | 8/2004 | Chu | H04L 67/36 |
| | | | | 715/251 |
| 2005/0022122 | A1* | 1/2005 | Barrus | H04N 1/2183 |
| | | | | 715/255 |
| 2008/0134218 | A1 | 6/2008 | Kim | |
| 2008/0201695 | A1 | 8/2008 | Zhou | |
| 2009/0265705 | A1* | 10/2009 | Wei | G06F 8/44 |
| | | | | 717/176 |
| 2012/0276880 | A1* | 11/2012 | Angorn | H04W 4/12 |
| | | | | 455/414.1 |
| 2016/0027082 | A1* | 1/2016 | Noyes | G06Q 30/02 |
| | | | | 705/26.5 |

OTHER PUBLICATIONS

Levy, M. R.: "Compiling SVG: How and Why," SVG Scalable Vector Graphics Specification, XX, XX, Jul. 18, 2008 (Jul. 18, 2003), pp. 1-11, XP002484002.

Flamingo SVG Transcoder; S.1-2, URL: http://ebourg.github.io/flamingo-svg-transcoder, saved in http://www.archive.org on Nov. 22, 2014 [downloaded on Sep. 8, 2015] with svg2java; S. 1. URL: http://code.google.com/p/svg2java/, saved in http://www.archive.org am May 17, 2012 [downloaded on Sep. 8, 2015].

\* cited by examiner

METHOD FOR GENERATING EXECUTABLE APPLICATIONS WITH DYNAMIC SCALABLE VECTOR GRAPHICS AND COMPILER FOR CARRYING OUT THE METHOD

CROSS-REFERENCE TO RELATED APPLICATION

This application claims the priority, under 35 U.S.C. § 119, of German Application DE 10 2014 225 557.0, filed Dec. 11, 2014; the prior application is herewith incorporated by reference in its entirety.

BACKGROUND OF THE INVENTION

Field of the Invention

The invention relates to a method for generating executable applications with dynamic scalable vector graphics by using a compiler operated by a computer. The invention also relates to a compiler for carrying out the method.

The technical field of the invention is the field of information technology.

In the field of information technology, animated graphics have been widely used in graphical user interfaces (GUIs) for a relatively long time. Those animations allow the concept of operations of the software to be understood intuitively or facilitate intuitive understanding thereof. There are various approaches to creating and incorporating those animations in graphics. A common approach is the use of scalable vector graphics (SVG), which are a specification for describing two-dimensional vector graphics. SVG are formed of an XML-based file format, which allows computer-assisted reading and translation as well as automated further processing. The XML structure additionally allows easy integration of the SVG in online applications such as browsers. Most browser applications in use today support the use of SVG, making SVG widely used on the Internet. Their use in stand-alone programs, i.e. software that is executable as an individual component, is more difficult. In order to be able to use scalable vector graphics, the software needs to browse the XML document on which the SVG is based and to use the information on the properties of the graphics that has been obtained in that way to generate the desired image. The exact steps to be taken by the software to process the graphics depend on the intended use. In most cases, the graphics will be represented on a display. In that respect, the further steps to be taken by the software depend on the available target hardware of the display and on the software environment, in particular the operating system. Thus the job of the programmer of the GUI of the stand-along program is to reprogram the image content of every SVG that he or she wants to use in his or her GUI based on the information obtained from the XML file. In particular for very complex GUIs that use a correspondingly high number of graphics and animations, the time and effort involved for the individual programmer are disproportionally high. However, not using vector graphics that are complex to incorporate is often not an option because in most cases the design of the user interface is not the programmer's responsibility. The complex GUIs mentioned above in particular are frequently designed by a designer or a team of designers and the programmer/s merely has/have to implement the design in a program. Due to the easily analyzable XML structure of the SVG, a generic solution to the problem is clear. That solution substantially is formed of a code generator that reads the SVG in XML structure and, using the information obtained in that way, generates a source text in the desired programming language. Many such code generators are known in the art under the term metaprogramming. In most cases, they are adaptive programs that are capable of modifying and/or generating program codes by themselves. Another approach is, however, that of a classic code generator that receives information on the desired functionality of the target program and, based on that information, generates parts or the entire source code of the program to be created. For that purpose, the function and in particular the execution of the program need to be described with maximum accuracy. In most cases, complete program models written in a modeling language such as UML are used as input data. Other data input formats such as templates, scripts, and other source codes are possible. The modeling of the function of the program may also be available in XML form.

What the prior art does not disclose, however, is the specific generation of codes for SVG, in particular in terms of the automated translation of SVG in high level languages such as JAVA or C++. What is known, however, is to convert SVG into FXML, an XML-based language, created as a user interface for the JAVA FX platform. Yet that is not a conversion of SVG into a higher-level programming language. For that purpose, further conversion steps or generating steps are required. In addition, those types of conversions have very poor performance in terms of the generation of code, making them unsuitable for larger amounts of data.

SUMMARY OF THE INVENTION

It is accordingly an object of the invention to provide a method for generating executable applications with dynamic scalable vector graphics and a compiler for carrying out the method, which overcome the hereinafore-mentioned disadvantages of the heretofore-known methods and compilers of this general type and which provide a code generator, which will be referred to below as a compiler, for higher-level programming languages that converts animated scalable vector graphics into the source code of a higher-level programming language.

With the foregoing and other objects in view there is provided, in accordance with the invention, a method for creating executable applications with dynamic scalable vector graphics by using a compiler operated by a computer. Dynamic elements of the scalable vector graphics include at least one attribute and in the compiling process, based on this at least one attribute, the compiler translates the dynamic elements of the scalable vector graphics into program code that is an integral part of the program code of the executable applications.

The decisive aspect of the invention is the link between design and programming. The designer who designs the animated SVG that are later integrated into the GUI marks the dynamic elements of the SVG with a specific attribute. The compiler recognizes the attribute once it has parsed and analyzed the SVG and translates the attribute that describes the dynamic element into the source code of the target programming languages. Then the programmer only needs to integrate the source code that has been generated in this way into his or her program that generates the graphical user interface. The method discloses a number of clear advantages, the most important one being that the programmer no longer has to reprogram the dynamic properties of the animated SVG and thus no longer has to re-implement the work that has already been done by the designer. Thus the automated generation of codes results in a considerable improvement of the performance of the entire software development process.

In accordance with a further preferred development, the program code is a source text in a higher-level programming language that is readable by humans. In a preferred way, the generated source code is to be generated in a higher-level programming language such as JAVA or C++. Although it is possible to generate machine-oriented source code such as Assembler, the use of a higher-level programming language facilitates the merging of the generated source code with the program code written by human developers.

In accordance with another preferred development, the scalable vector graphics processed by the compiler is configured in accordance with the XML specification. In terms of their format, the SVG and their standard, respectively, are based on the XML standard. A plurality of automated interpreters is available for evaluating XML code. Their use facilitates the automated evaluation of the SVG for the compiler.

In accordance with an added preferred development, the compiler searches for the names of the dynamic elements in the XML file of the scalable vector graphics and these names contain at least one attribute.

The aforementioned attributes are integrated in the name of the dynamic element by the designer of the SVG. This allows the compiler to parse the SVG and to look for the names of the dynamic elements. When it has found this name, it extracts the corresponding attribute from the name and evaluates it.

In accordance with an additional preferred development, the compiler recognizes the at least one attribute within the names of the dynamic elements due to a predefined separator.

Since a dynamic element may have several attributes, it is necessary to define a separator for separating multiple attributes from each other in a way that is recognizable to the compiler. In addition, the attribute clearly needs to be separated from the rest of the name of the dynamic element. This is made possible by inserting a separator that the compiler specifically looks for when it has found the name of the dynamic element. The attribute corresponds to the text line from the separator to the beginning of the string or to the previous separator if there are multiple attributes.

In accordance with yet another preferred development, every attribute is marked by the defined separator if there are multiple attributes for a dynamic element. When there are multiple attributes for a dynamic element, the individual attributes are separated from each other by the defined separator as mentioned above.

In accordance with yet a further preferred development, non-dynamic components of the scalable vector graphics are translated into program code by the compiler.

In order to complete the automated generation of source code for the SVG, a clear step is to have the non-animated, i.e. non-dynamic components of the scalable vector graphics translated into source code by the computer. This even further reduces the work to be done by the human programmer.

With the objects of the invention in view, in order to implement the disclosed method, there is concomitantly provided a compiler for translating dynamic elements of scalable vector graphics into program code. The compiler is distinguished by the fact that dynamic elements of the scalable vector graphics are marked by an attribute and that based on this attribute, the compiler translates the dynamic elements of the scalable vector graphics into program code during the compiling process.

Other features which are considered as characteristic for the invention are set forth in the appended claims.

Although the invention is illustrated and described herein as embodied in a method for generating executable applications with dynamic scalable vector graphics and a compiler for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The method of the invention and functionally advantageous further developments of the method will be explained in more detail below with reference to the associated drawings and based on at least one preferred exemplary embodiment. In the drawings, corresponding elements have the same reference symbols.

DETAILED DESCRIPTION OF THE INVENTION

Figure 1:
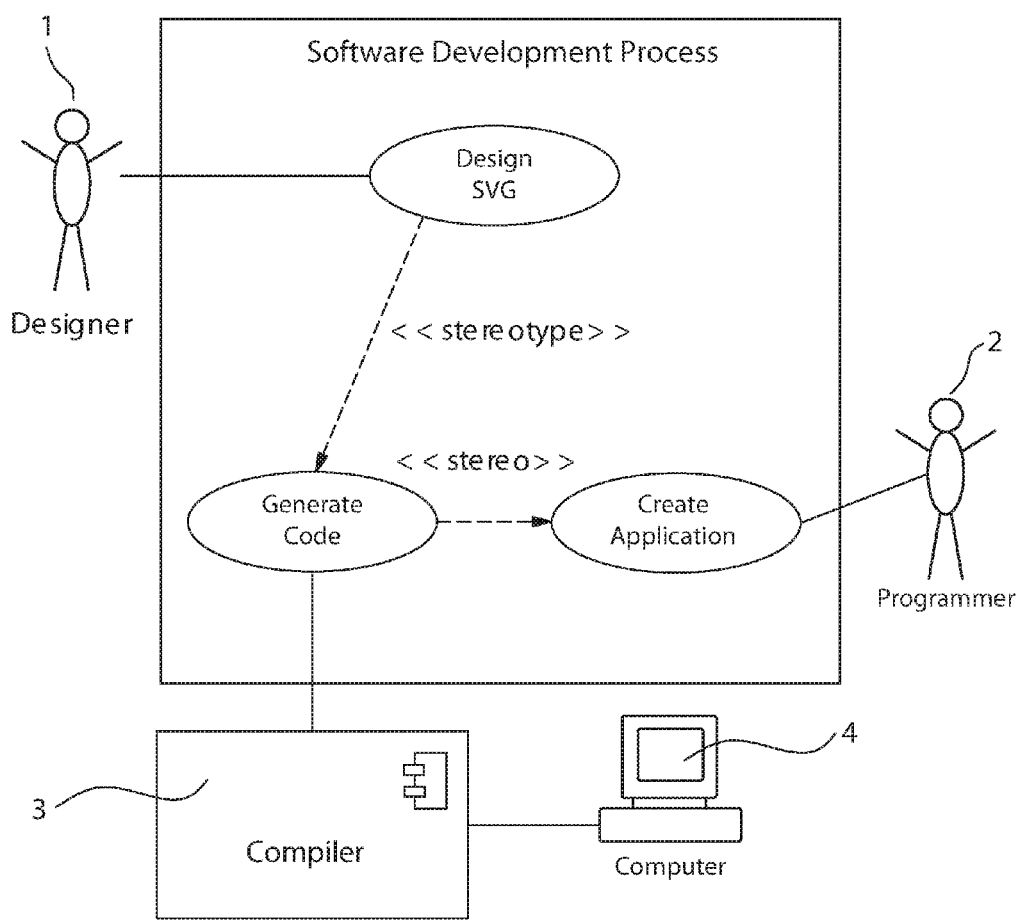
FIG. 1 is a diagram illustrating the circumstances and context of use of the compiler.

Referring now to the figures of the drawings in detail and first, particularly, to FIG. 1 thereof, there is seen a diagrammatic illustration of the circumstances of use of a compiler 3. A designer 1 creates the design of the graphical user interface and for this purpose draws a number of animated SVG 5. In this process, the designer 1 needs to stick to the naming conventions stipulated by the compiler 3 when he or she names the dynamic elements 8. The compiler 3, which runs on a computer 4 having a processor and memory, interprets the SVG 5 that have been created by the designer 1 and generates the desired source code 6 in the higher-level programming language, in particular JAVA, from the dynamic elements 8. The programmer 2 in turn integrates the generated source code into his or her program code and generates the completed application 7.

Figure 2:
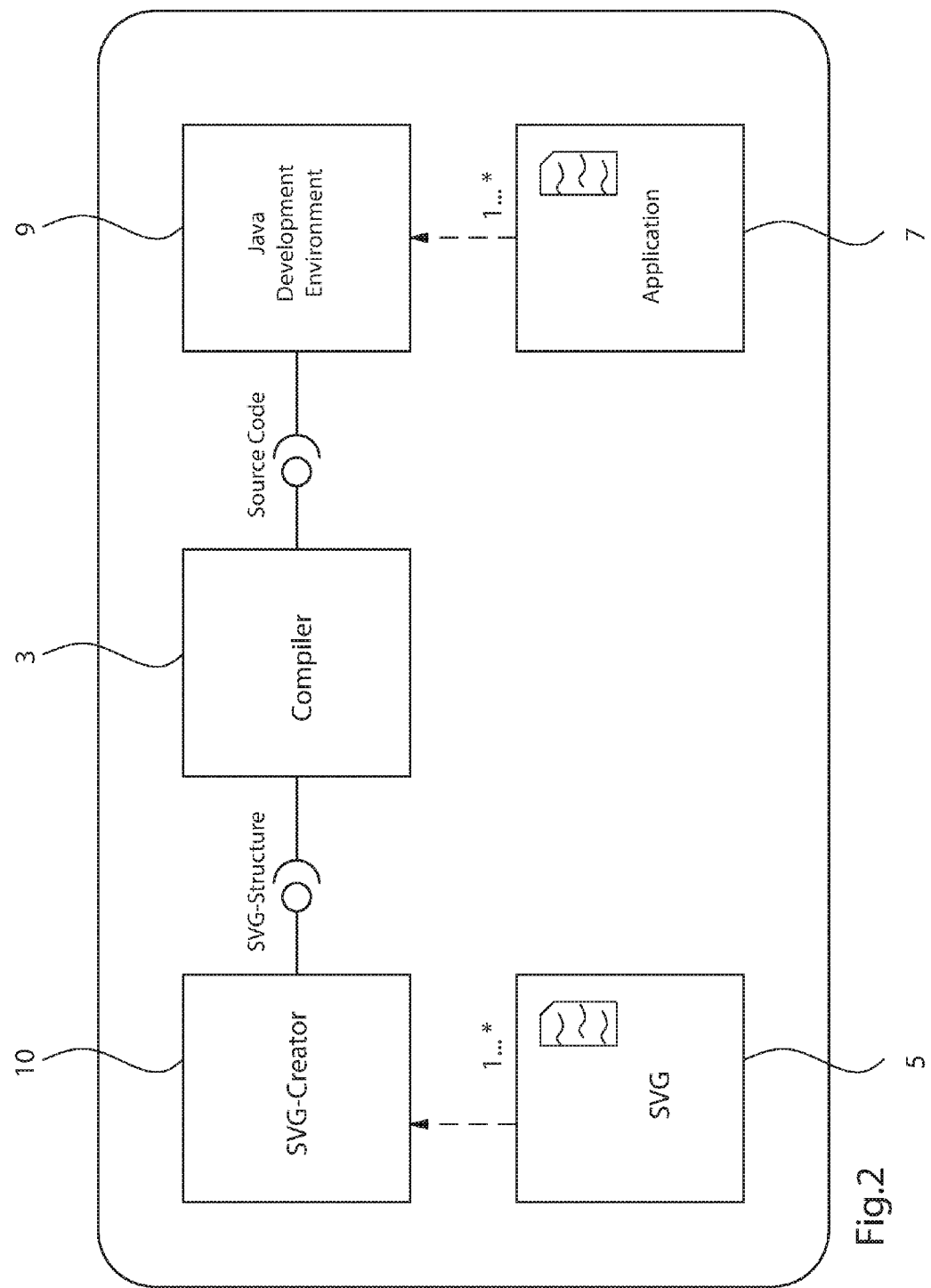
FIG. 2 is a diagram illustrating the structural layout of the compiler and its development environment.

The configuration of the development environment necessary for this purpose is shown in more detail in FIG. 2. The designer uses an SVG creator 10, i.e. a program for creating the animated SVG. A known tool 10 for this purpose is Adobe Illustrator, for instance. Between the SVG creator 10 and the compiler 3 there is an interface that refers to the structure of the SVG 5. In this case this means that the compiler 3 expects a specific naming convention in the naming of the dynamic elements 8 of the SVG 5. If this naming convention has been followed, the compiler 3 generates the Java source code from the dynamic elements 8 as described above. The generated source code may be integrated into the entire project in the JAVA development environment 9, resulting in a creation of the complete application, i.e. of the GUI, in the JAVA development environment 9.

Figure 3:
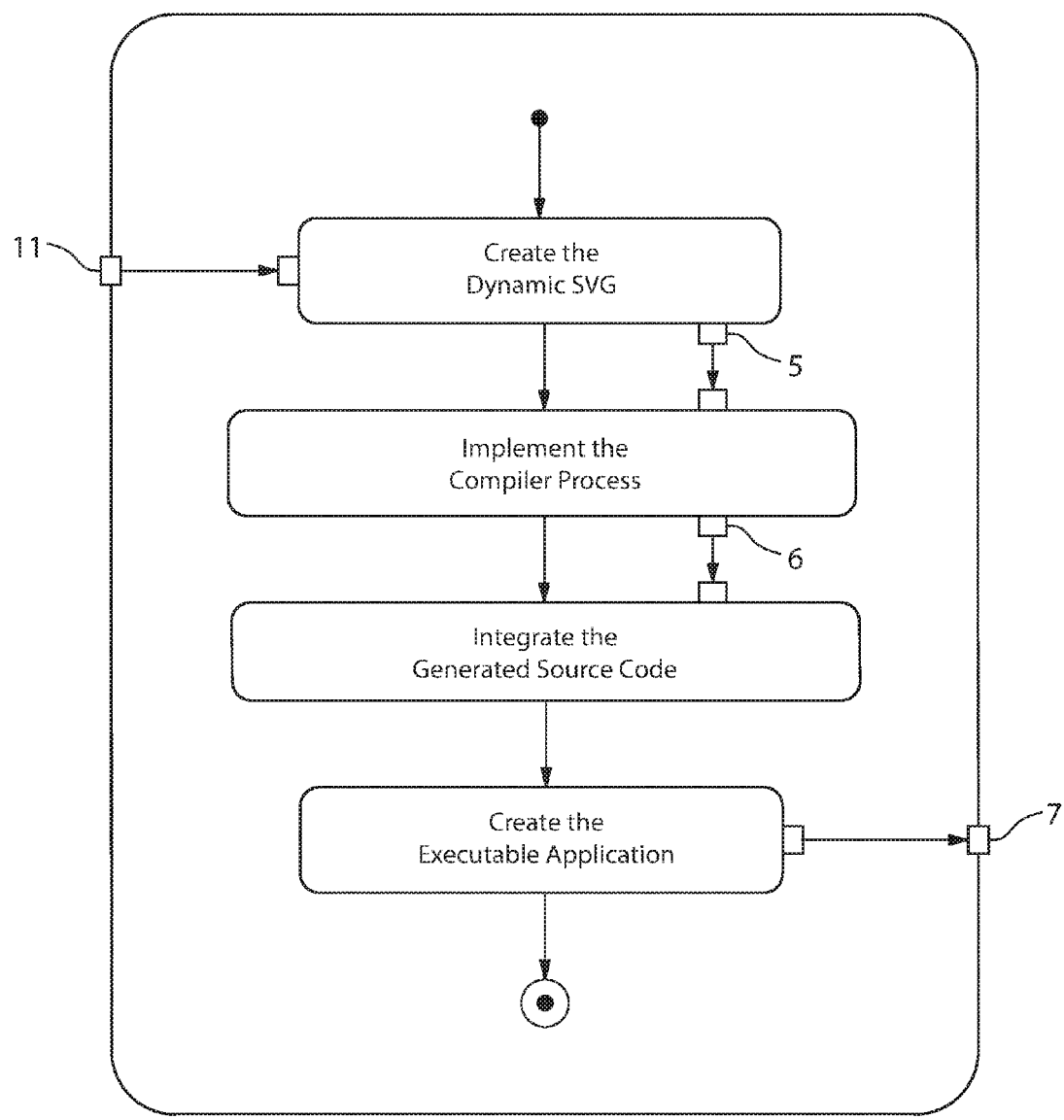
FIG. 3 is a flow chart of the method of the invention.

A flow chart of the steps involved is diagrammatically shown in FIG. 3: The designer/s create/s the desired SVG 5. The SVG 5 are uploaded in the compiler 3, which generates the desired JAVA source code based on the uploaded SVG 5. In this process, the compiler 3 parses the XML structure of the SVG 5 and, based on the separators, detects the attributes of the dynamic elements 8 of the SVG 5. Based on these attributes, the compiler 3 then creates the source code. The programmer's job now is to integrate the generated source code into his or her program code for the GUI to be created. The complete program code is then used to create the finished, executable application 7.

Figure 4:
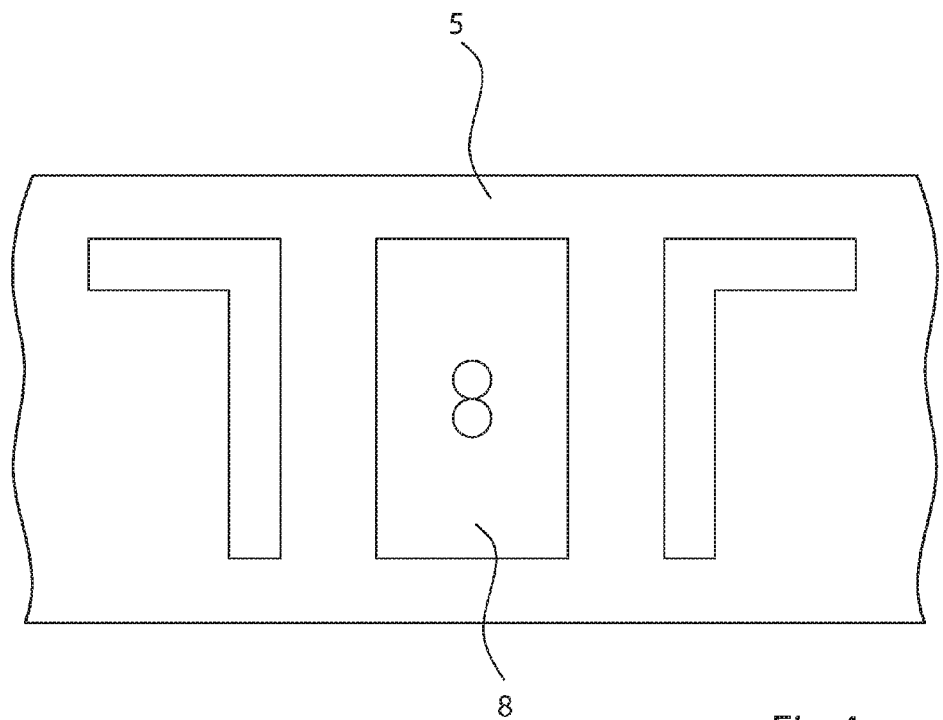
FIG. 4 is a fragmentary illustration of an example of an SVG with an inactive dynamic element.

FIG. 4 illustrates an example of an SVG 5 with a dynamic element 8. In this case, the dynamic element is the cartridge ink level. Its attribute is an integer value between 0 and 100. Since the cartridge ink level in FIG. 4 is zero, i.e. the cartridge is empty, the attribute's value is zero.

Figure 5:
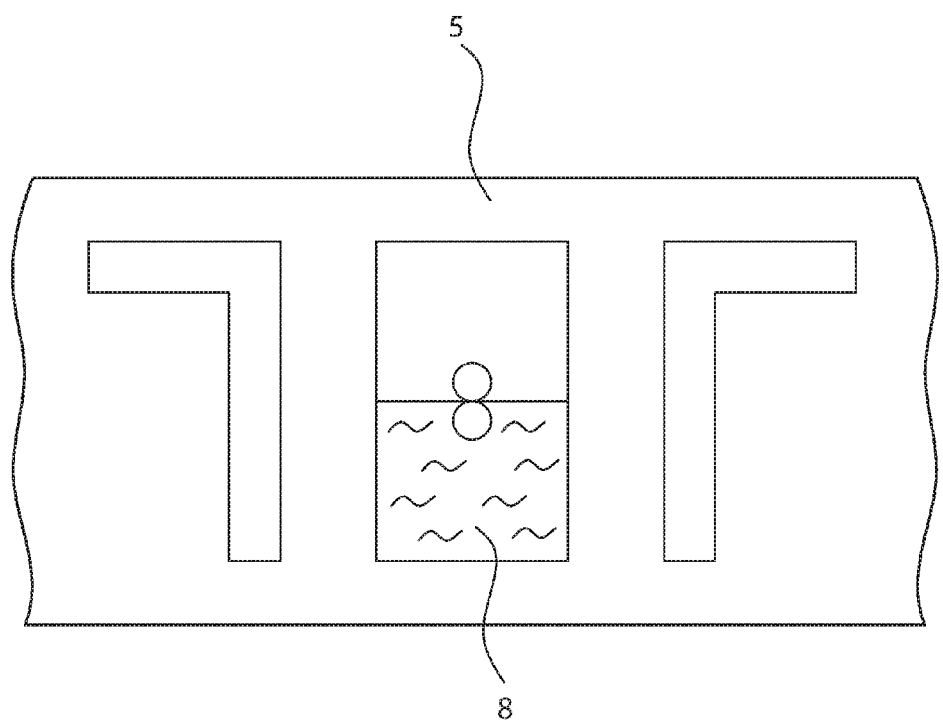
FIG. 5 is a fragmentary illustration of an example of an SVG with an active dynamic element.

FIG. 5 shows the same SVG 5 with an active animated component, i.e. an active dynamic element 8. The cartridge ink level is at 50%, but it may have any other value between 0 and 100. The limits of the attribute (0 and 100% in the given example) are part of the attribute itself. This means that they are included in the name of the dynamic element 8 between the defined separators in accordance with the naming convention for the attributes. In the example illustrated in FIG. 5, the cartridge ink level might be 30% or 60%. 50% is an arbitrary value.

The invention claimed is:

1. A computer-implemented method for generating executable applications with dynamic, scalable vector graphics using a compiler, where the scalable vector graphics are processed by the compiler in accordance with an XML specification, the method comprising the following steps:

providing dynamic elements of the scalable vector graphics with at least one attribute;

marking each one of the attributes by a defined separator, when there are multiple attributes for a dynamic element; and during a compilation process, parsing and analyzing the scalable vector graphics, with a processor executing the compiler, by using the compiler to search an XML file of the scalable vector graphics for names of the dynamic elements, the names containing the at least one attribute, to identify the at least one attribute, wherein the compiler recognizes the at least one attribute within the name of the dynamic elements based on the defined separator, and translating, with a processor executing the compiler, the dynamic elements of the scalable vector graphics into program code being part of a program code of the executable applications, based on the at least one attribute identified.

2. The method according to claim 1, wherein the program code is a source text in a higher-level programming language being readable by humans.

3. The method according to claim 1, which further comprises using the compiler to translate non-dynamic components of the scalable vector graphics into program code.

4. A system for translating dynamic elements of scalable vector graphics into program code, the system comprising:

a processor, executing a compiler that processes the scalable vector graphics in accordance with an XML specification, that parses and analyzes the scalable vector graphics, to identify an attribute marking the dynamic elements of the scalable vector graphics, by using the compiler to search an XML file of the scalable vector graphics for names of the dynamic elements, the names containing the at least one attribute, wherein each of the attributes is marked by a defined separator, when there are multiple attributes for a dynamic element, and the compiler recognizes the attribute within the name of the dynamic elements based on the defined separator; and the processor additionally configured by the compiler during a compilation process to translate the dynamic elements of the scalable vector graphics into program code on the basis of the attribute identified.

* * * * *